3 Sheets—Sheet 1.
E. T. BOUSFIELD.
Horse Hay-Rakes.
No. 197,322. Patented Nov. 20, 1877.
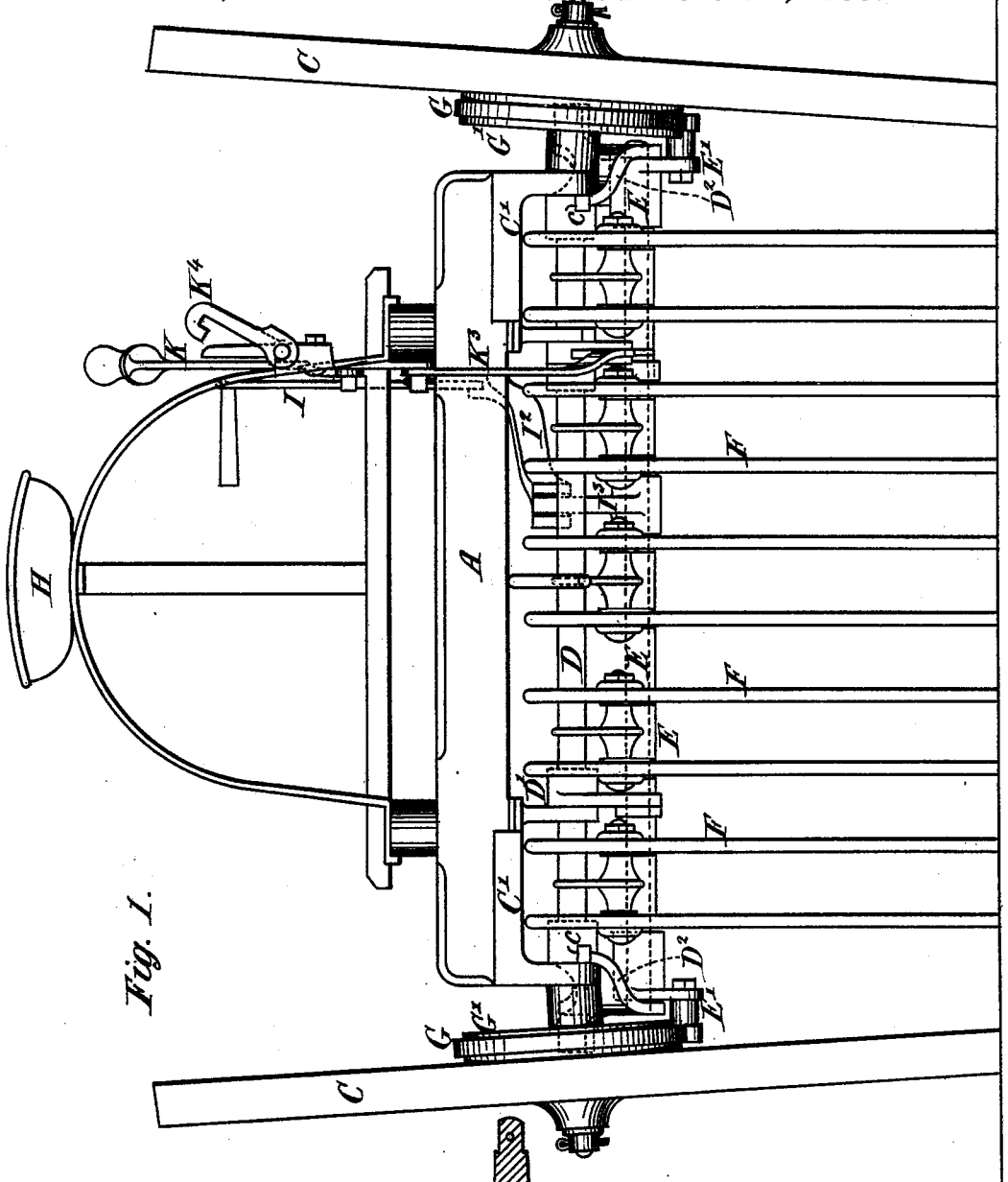
Fig. 1.
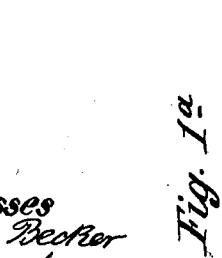
Fig. 1ª
Witnesses
John Becker
Fred Haynes
Inventor
E. T. Bousfield
by his Attorneys
Brown & Allen

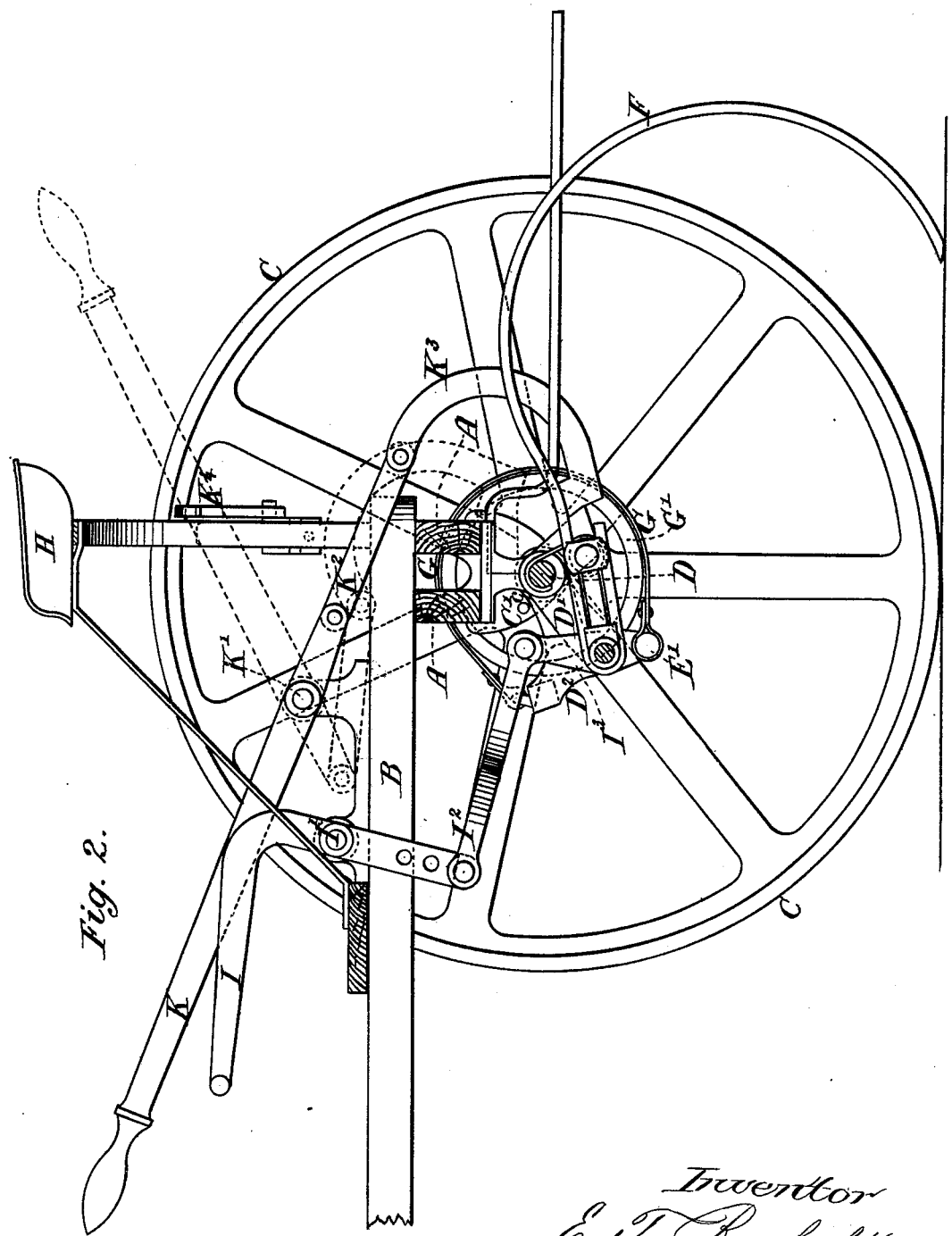

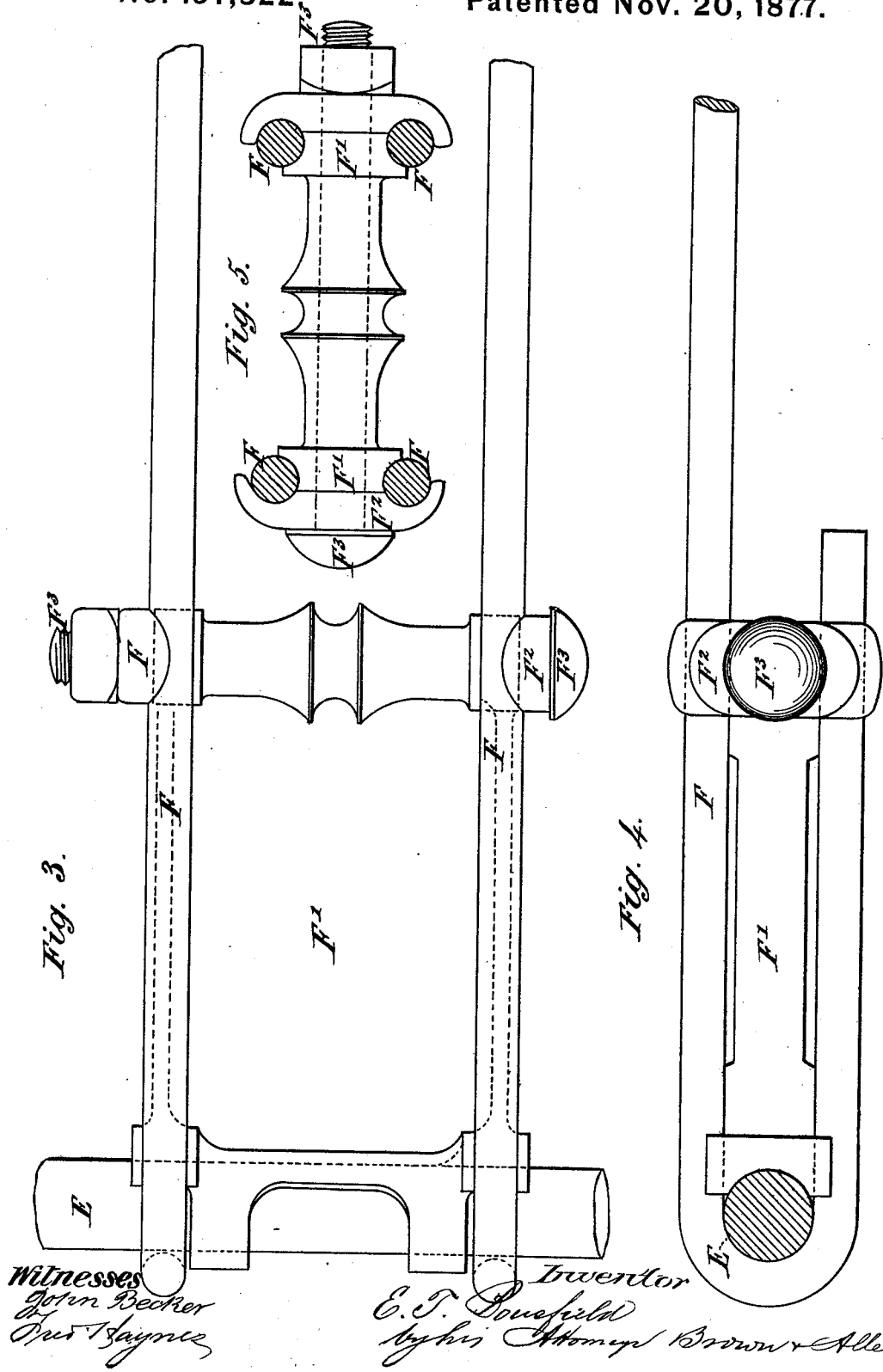

UNITED STATES PATENT OFFICE.

EDWARD TENNEY BOUSFIELD, OF BEDFORD, ENGLAND.

IMPROVEMENT IN HORSE HAY-RAKES.

Specification forming part of Letters Patent No. 197,322, dated November 20, 1877; application filed July 19, 1877.

*To all whom it may concern:*

Be it known that I, EDWARD TENNEY BOUSFIELD, of Bedford, in the county of Bedford, England, have invented certain Improvements in Horse-Rakes, of which the following is a specification:

The chief object of this invention is to simplify the construction of horse-rakes, to increase their efficiency, and to reduce their cost of manufacture.

In the accompanying drawings, Figure 1 is a back elevation of the improved horse-rake. Fig. 2 is a sectional elevation taken in the line 1 2 of Fig. 1; and Figs. 3, 4, and 5 are enlarged views of the tine-couplings, Fig. 3 being a plan view of the tine-head, Fig. 4 a side view, and Fig. 5 an end view, showing the tines in cross-section.

In Figs. 1 and 2, A is the main frame of the implement, which frame is made, by preference, of two transverse timbers, braced together by means of the shafts B. This frame is carried clear above the tines, in order that there may be no impediment to the locking of the tine-frame, and no obstruction to the collecting and delivery of the cut crops. C C are the traveling wheels, fitted to cranked stud-axles C', which are securely bolted to the under side of the frame A. These axles (see the detached view, Fig. 1ª) are formed with sockets to receive the fulcrum-rod D of the tine-frame or cradle, the axis of which is coincident, or nearly so, with the axes of the stud-axles. Upon this fulcrum-rod, at suitable distances apart, are keyed bracket-arms $D^1$ $D^2$, with socket-bearings at their extremities to receive a rod, E, on which the tines F are hung. The arms $D^2$, which are keyed to the ends of the fulcrum-rod D, are cranked, and constitute, with the rods D and E, what is known as the "cradle" of the horse-rake. These arms $D^2$ strike against stops c c on the stud-axles C' when the levers fall, and they prevent injury to the cradle and levers when the rake is accidentally backed. The tine-rod E is loose in its bearings, to permit of its receiving an axial motion.

The tines it is preferred to make in pairs, two tines being attached to the same head, in the manner to be presently explained. Each tine-head is fitted with a link, which link is connected to the fulcrum-rod in such manner that when the tine-heads are depressed by the rocking of the cradle the tines will be lifted from the ground. This lifting action, which is produced, as heretofore, by connecting the cradle with the traveling wheel C through friction-bands G, or (as their equivalent) ratchet-wheels and pawls, I now propose to obtain by employing the tine-rod E as a substitute for the special rock-bar heretofore used for this purpose.

The friction-bands G, which embrace friction-rings G' cast on the traveling-wheels, are connected at one end with the cranked arms $D^2$, and at the other end to arms E', keyed to the tine-rod E. By rocking the tine-rod in its bearings the bands G will be tightened on their friction-rings, and the rotation of the traveling wheels, as the implement moves forward, will depress the tine-axle E, and cause the tines to rise out of work and release the gathered crop.

This rocking of the tine-rod to bring the friction-bands G into action is effected by the attendant, who, mounted on the seat H, by applying his foot to the treadle-lever I, which has its fulcrum at $I^1$, and is connected at its lower end by a link, $I^2$, to an arm, $I^3$, keyed on the tine-rod E, gives the desired rocking motion to that rod. On his relieving the treadle-lever from the pressure of his foot, the bands G will be instantly slackened, and tines F will fall to the ground, to resume the gathering action.

In order to raise the tines from the ground by hand, or when the implement is stationary, and to lock them in a raised position, the hand-lever K is provided. This lever has its fulcrum at $K^1$, and it is connected by a link, $K^2$, to a cranked lever, $K^3$, which passes through a socket cast in one of the bracket-arms $D^1$, and is secured to the tine-rod E by that rod passing through a hole in its extremity. By lifting the hand-lever K and bringing it to the dotted position of Fig. 2, the cradle will be rocked and the tines raised from the ground. To retain the tines in this position, the catch $K^4$ is caused to take onto the hand-lever K, and hold it in the dotted position.

I will now explain the manner of connecting the tines to the tine-heads, the object being to facilitate the removal of a tine when broken or damaged, and its replacement by a new one.

F F are the tine-rods, made of the ordinary round steel, one end being doubled back to form a loop for the reception of the tine-rod E, and to enable the tines each to embrace one side of a hollow rectangular cast head, $F^1$. Recesses are made in the sides of this head to receive the round steel, and the tines are secured in place by clamps $F^2$, that are caused to bind against the round steel by means of a screw-bolt, $F^3$, passing through the clamps and through a hole in the cross-piece of the tine-head.

In some cases I may find it convenient to group three tines together, in order to obtain the required weight upon the tine-points.

Having now described my invention of improvements in horse-rakes, I wish it to be understood that I claim—

1. The tine-rod E, capable of being rocked in its bearings in the cradle $D^2$ by a treadle, I, or its equivalent, in combination with the rings $G'$ on the traveling wheels, and the friction-bands G, applied to said rings, and tightened thereon by the rocking of the tine-rod, substantially as herein described.

2. The looped tine-rods, secured to the tine-bar E by a head, $F^1$, clamps $F^2$, and screw-bolt $F^3$, as described.

3. The rocking cradle, consisting of the fulcrum-rod D, rocking tine-rod E, and crank-arms $D^2$, for carrying the tines, as described.

London, the 14th day of May, 1877.

EDWARD TENNEY BOUSFIELD.

Witnesses:
  H. K. WHITE,
  A. S. BISHOP,
    66 *Chancery Lane, London.*